3,190,797
BIOCIDAL AGENTS

Jakob Bindler, Riehen, near Basel, Ernst Model, Basel, and Robert Zinkernagel, Riehen, near Basel, Switzerland, assignors to Geigy Chemical Corporation, Ardsley, N.Y., a corporation of Delaware
No Drawing. Filed Aug. 16, 1960, Ser. No. 49,818
Claims priority, application Switzerland, Aug. 17, 1959, 77,045/59
3 Claims. (Cl. 167—33)

This invention concerns biocidal agents, their use for the protection of organic material from attack by fungi and from damage by rot as well as, as industrial product, the organic material protected by these agents from attack by fungi and rot.

It has been found that 4,5,6,7-tetrachloro-2,3-dihydrobenzoxazole-2-one of the formula

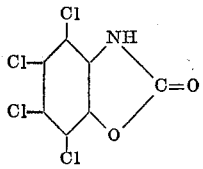

is excellently suitable for the protection of organic material from attack by fungi and damage by rot. In the following, this property will be referred to as fungicidal action and the active substance will be termed fungicidal agent by which term, the expression "fungicidal" can also include a fungistatic action.

Also the tautomeric form, namely, 4,5,6,7-tetrachloro-2-hydroxybenzoxazole, such as is formed by the replacement of hydrogen from the ring nitrogen atom to the carbonyl-oxygen atom, as well as the salts of this tautomeric form, in particular the alkali metal salts or also the ammonium salts are considered as embraced by the above formula.

The 2,3-dihydrobenzoxazole-2-one chlorine-substituted in the ring which is used according to the invention is obtained, for example from 4,5,6,7-tetrachloro-2-aminophenol on reaction with phosgene.

If desired, the chlorine atoms can be introduced into the 2,3-dihydrobenzoxazole-2-one compound only afterwards, for example, into 2,3-dihydrobenzoxazole-2-ones having a free 6-position. The 4,5,6,7-tetrachloro-2,3-dihydrobenzoxazole-2-one used according to the invention is a colourless to weakly yellowish coloured substance which is only slightly soluble in hot water. The alkali metal salts, for example, the lithium, sodium and potassium salts, also the magnesium or calcium salts, as well as the ammonium salts of strong inorganic or organic nitrogen bases are much more easily soluble. Because of these solubility properties and because of their relatively good stability to alkalies, the chlorinated 2,3-dihydrobenzoxazole-2-one used according to the invention can be incorporated into textile treatment liquors, in particular into capillary active washing liquors which can contain, in addition to the usual synthetic wash-active substances and/or soaps, also the usual fillers such as sodium carbonate, sodium silicates and alkali mono- and polyphosphates as well as the other ingredients generally used in washing agents. It can be mixed direct with such washing and cleansing agents and also with soap, and washing liquors are obtained with cleansing agents so composed which protect the material treated therewith from attack by fungi and damage thereby. The sufficient solubility of the active substances in organic solvents such as are used in so-called dry cleaning, enables them to be used in dry cleaning agents consisting of aliphatic or aromatic, possibly chlorinated, hydrocarbons and which, generally, also contain potassium salts of anion active wetting and cleaning agents which are soluble in oil, as well as for the production of so-called sprays. In addition, it can be mixed with paper treatment liquids or printing thickeners of starch or cellulose derivatives, or it can be used for impregnating wood. Also an effective protection against attack by fungi is obtained with the substance used according to the invention in polyvinyl chloride preparations, for example in sheets as well as lacquers and paints which are produced from a casein base or contain casein. All these compositions characterised by a content of fungicidal active substance of the general formula given above are regarded as coming within the scope of the process according to the invention.

Compared with the low halogenated 2,3-dihydrobenzoxazole-2-ones, the active substance used according to the present invention has the advantage of being more active against fungi; however, it has a relatively good action against bacteria also.

The fungicidal active substance is generally brought onto the organic material to be protected either by mixing, spraying or by impregnating with organic aqueous or aqueous/alkaline solutions of the active substance or with washing, cleaning or rinsing liquors containing the active substance dissolved or dispersed therein. In general, contents of 0.5 to 10 g. of active substance per litre treatment liquor are sufficient to attain effective protection for the treated materials. Possibly the stability, to washing of the fungicidal agent on the treated material can be still further increased by an after-treatment with agents giving off heavy metal. Copper salts, for example, can be used as such agents. Cellulose material such as textiles, cellulose, wood and paper etc. are the principal organic materials to be protected; reference has already been made above to the use in printing pastes or in lacquers having a casein base.

The following example illustrates the invention. Where not otherwise expressly stated, parts are given as parts by weight. The temperatures are in degrees centigrade. The relationship of parts by weight to parts by volume is as that of grammes to cubic centimetres.

Example 20 parts of 4,5,6,7-tetrachloro-2,3-dihydrobenzoxazole-2-one and 10 parts of 30% caustic soda lye are dissolved in 400 parts by volume of ethylene glycol monomethyl ether and this stock solution is diluted with water to produce a treatment liquor which contains 0.5 g. of active substance per litre.

Calico is treated for 30 minutes at 40° in this liquor (liquor ratio 1:10), squeezed out until the increase in weight is 72% and then dried cold. The material so treated is protected against mildew spots and rot as the following tests show:

(a) *Mildew spot test.*—Circular patterns of fabric of 9 cm. diameter are placed in petri dishes on an agar nutrient medium and inoculated with a suspension of a mixture of spores of *Penicillium expansum*, *Stachybotrys atra* and *Aspergillus niger*, which contains 40,000 germs per ccm. The closed petri dishes are left for 10 days at 28° and then the number of fungi colonies is counted.

(b) *Rotting test.*—Circular patterns of fabric of 3.8 cm. diameter are placed in petri dishes on an agar nutrient medium which is injected with 0.5 ccm. of a suspension of spores of *Chaetomium globosum*, which suspension contains about 700,000 germs per ccm. It is left to breed for 10 days at 28°, the development of the germs is interrupted with an alcoholic thymol solution, the pieces of material are rinsed and dried. The material is then tested in the spot tester according to R. Burgess (Microorganismus and Textiles: The Journal of Applied Bacteriology 17, 241 (1954)), to see if the strength of the material has been reduced.

In the rotting test, the value given is the average of 10 tests. The strength is given in percent of the original strength of the material. The following results were obtained

| Substance | Content of treatment liquor, g./litre | Mildew spot test, number of fungi colonies | | | Rotting test strength, percent |
|---|---|---|---|---|---|
| | | Pen. exp. | Stach. a. | Asp. n. | |
| According to example | 0.5 | 0 | 0 | 0 | 93 |
| Blank test | 0 | ∞ | ∞ | ∞ | 0 |

What we claim is:

1. The method of protecting an organic substrata against fungi and bacteria which comprises applying thereto a composition of matter consisting essentially of 4,5,6,7-tetrachloro-2,3-dihydrobenzoxazole-2-one in solution in an organic aqueous carrier.

2. The method of protecting an organic substrata against fungi and bacteria which comprises applying thereto a composition of matter consisting essentially of 4,5,6,7-tetrachloro-2,3-dihydrobenzoxazole-2-one in solution in an aqueous medium.

3. A cellulose material having an adherent coating consisting essentially of 4,5,6,7-tetrachloro-2,3-dihydrobenzoxaole-2-one, whereby the said material is protected against fungi and bacteria.

References Cited by the Examiner
UNITED STATES PATENTS

| | | | |
|---|---|---|---|
| 2,041,513 | 5/36 | Raeck | 260—307.3 |
| 2,583,425 | 1/52 | Hawley | 167—30 |
| 2,922,794 | 1/60 | Model et al. | 167—33 |
| 2,999,047 | 9/61 | Model et al. | 167—33 |

JULIAN S, LEVITT, *Primary Examiner.*

WILLIAM B. KNIGHT, MORRIS O, WOLK, IRVING MARCUS, *Examiners.*